(12) United States Patent
Ikuta

(10) Patent No.: US 12,067,316 B2
(45) Date of Patent: Aug. 20, 2024

(54) IMAGE FORMING APPARATUS, IMAGE DATA GENERATING APPARATUS, AND PROGRAM

(71) Applicant: KONICA MINOLTA, INC., Tokyo (JP)

(72) Inventor: Masaya Ikuta, Fuchu (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/312,761

(22) Filed: May 5, 2023

(65) Prior Publication Data

US 2023/0385000 A1 Nov. 30, 2023

(30) Foreign Application Priority Data

May 31, 2022 (JP) ................................ 2022-088450

(51) Int. Cl.
*G06F 3/12* (2006.01)

(52) U.S. Cl.
CPC .......... *G06F 3/1256* (2013.01); *G06F 3/1206* (2013.01); *G06F 3/1208* (2013.01); *G06F 3/125* (2013.01); *G06F 3/1255* (2013.01); *G06F 3/1204* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 2004/0190057 A1* | 9/2004 | Takahashi | G06F 3/1205 358/1.15 |
| 2009/0138812 A1* | 5/2009 | Ikedo | G06F 40/103 715/769 |
| 2010/0053680 A1* | 3/2010 | Sato | G06F 3/1264 358/1.15 |
| 2019/0246087 A1* | 8/2019 | Uesaka | H04N 9/8715 |

FOREIGN PATENT DOCUMENTS

JP 2003005471 A 1/2003

* cited by examiner

*Primary Examiner* — Darryl V Dottin
(74) *Attorney, Agent, or Firm* — BUCHANAN INGERSOLL & ROONEY PC

(57) ABSTRACT

An image forming apparatus includes a hardware processor that: sets a post-processing position to a sheet; determines whether or not the post-processing position is processable by a post-processing unit; and generates, when determining that the post-processing position is processable, image data in which the post-processing position to the sheet has been drawn, wherein the hardware processor generates the image data in a data format allowing display of the image data by software for creating or editing print content.

15 Claims, 12 Drawing Sheets

<POST-PROCESSING POSITION>

CREASE FORMING POSITION    · · · · ·

PERFORATION FORMING POSITION    · · · · ·

CUTTING POSITION    · · · · ·

| POST-PROCESSING POSITION | SETTING PROHIBITION RANGE |
|---|---|
| ⋮ | ⋮ |
| CREASE FORMING POSITION | 0—9 mm |
| PERFORATION FORMING POSITION | 0—10 mm |
| CUTTING POSITION | 0—5 mm |
| ⋮ | ⋮ |

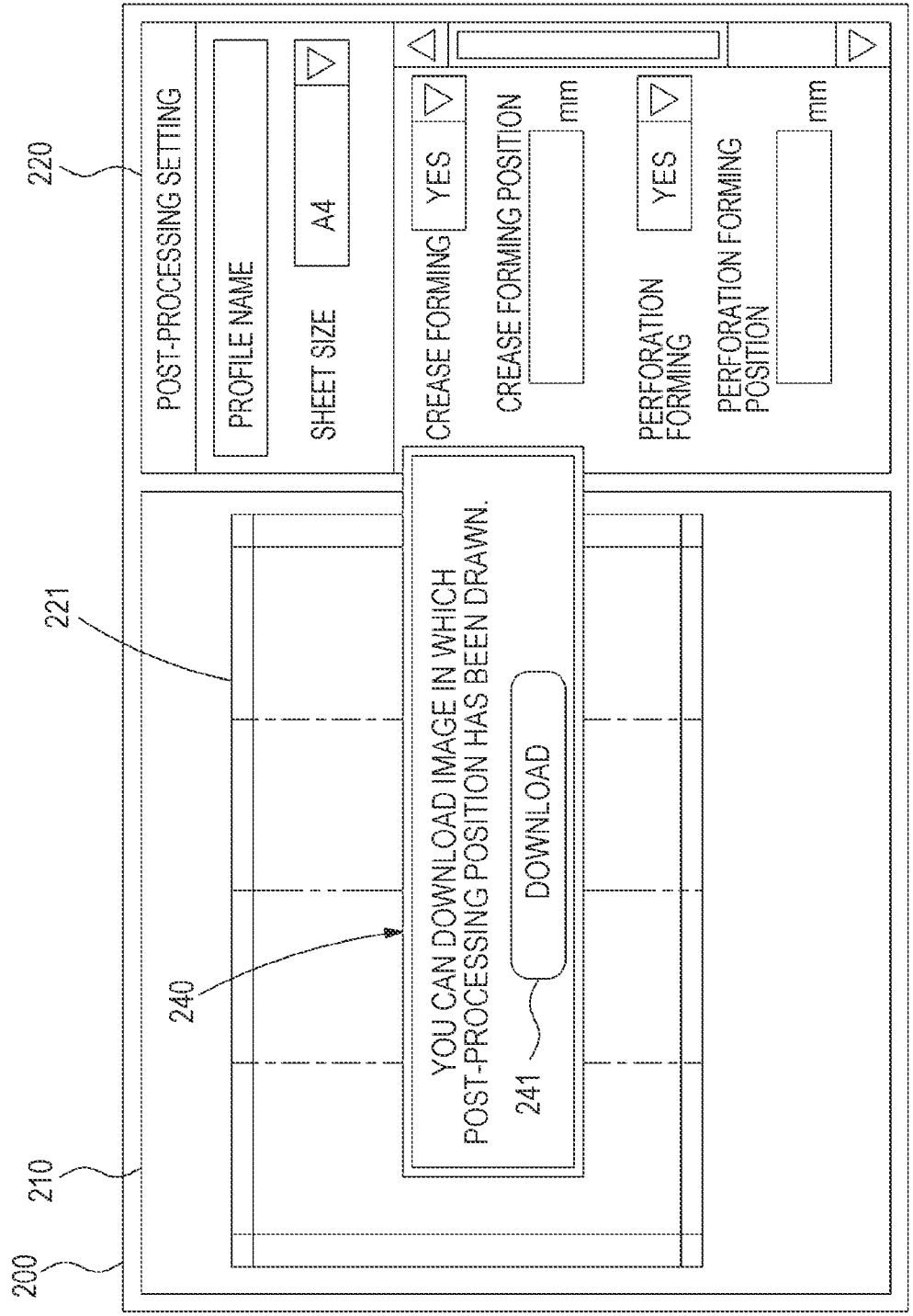

IMAGE FORMING APPARATUS, IMAGE DATA GENERATING APPARATUS, AND PROGRAM

The entire disclosure of Japanese patent Application No. 2022-088450, filed on May 31, 2022, is incorporated herein by reference in its entirety.

BACKGROUND

Technological Field

The present invention relates to an image forming apparatus, an image data generating apparatus, and a program, and particularly relates to a technique of assisting work for designing a print object to be output by an image forming apparatus with a post-processing unit incorporated.

Description of the Related Art

Some image forming apparatuses such as printers and multifunction peripherals (MFPs) can incorporate a post-processing unit. Such a post-processing unit is capable of forming a crease or a perforation on a print object discharged from the image forming apparatus or cutting the print object into a size specified by the user to output the print object resulting in a form such as a business card, a ticket, or a coupon. Thus, the user who designs a business card, a ticket, or a coupon can design a print object with a plurality of images imposed on a single sheet and can obtain, for example, the print having a desired size with the post-processing unit at the time of printing.

Conventionally, in order to display a position where post-processing is to be performed by the post-processing unit in an easy-to-understand manner for the user, proposed has been a technique of generating a preview image on the basis of an image read by a scanner and displaying the position for the post-processing in superimposition on the preview image (e.g., JP 2003-5471 A). According to the conventional technique, the user confirms the post-processing position displayed in superimposition on the preview image, so that the user can confirm whether or not the post-processing position is a desired position. In a case where the post-processing position deviates from the desired position, the user can perform an operation on the operation panel to adjust the post-processing position to the desired position.

There is a restriction on a post-processing position where the post-processing unit can form a crease or a perforation on a print object or cut the print object. For example, in order to cut the end portion of a print sheet, the print sheet is cut with its both ends at the cutting position held down. In consideration of a space for holding down the print sheet, the cutting position locates at least 5 mm or more away from the end portion of the print sheet. That is, the post-processing unit cannot cut a position less than 5 mm from the end portion of the print sheet. Further, there is a restriction on a position where a crease can be formed or a position where a perforation can be formed on the print sheet, so that the post-processing unit cannot form a crease or a perforation at a position that is set out of a predetermined range.

Thus, even if the user designs a print object and then causes a post-processing position to be displayed in superimposition on the preview image resulting from reading of the image of the print object, the post-processing position may not be set at a position desired by the user. In such a case, the user has to re-design the print object, leading to a significantly poor work efficiency.

SUMMARY

Therefore, the present invention has been made to solve the above disadvantages, and an object of the present invention is to provide an image forming apparatus, an image data generating apparatus, and a program that enable grasp of a post-processing position for a post-processing unit in designing of a print object such that an occurrence of redoing the design work can be reduced.

To achieve the abovementioned object, according to an aspect of the present invention, an image forming apparatus reflecting one aspect of the present invention comprises a hardware processor that: sets a post-processing position to a sheet; determines whether or not the post-processing position is processable by a post-processing unit; and generates, when determining that the post-processing position is processable, image data in which the post-processing position to the sheet has been drawn, wherein the hardware processor generates the image data in a data format allowing display of the image data by software for creating or editing print content.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 illustrates exemplary setting information;

FIG. 6 illustrates exemplary prohibition information;

FIGS. 10A and 10B each illustrate another exemplary operation screen displayed on the information processing device;

DETAILED DESCRIPTION OF EMBODIMENTS

Hereinafter, one or more embodiments of the present invention will be described with reference to the drawings. However, the scope of the invention is not limited to the disclosed embodiments. Note that elements common to each other in the embodiments below are denoted with the same reference signs, and thus redundant description thereof will not be given.

First Embodiment

Figure 1:
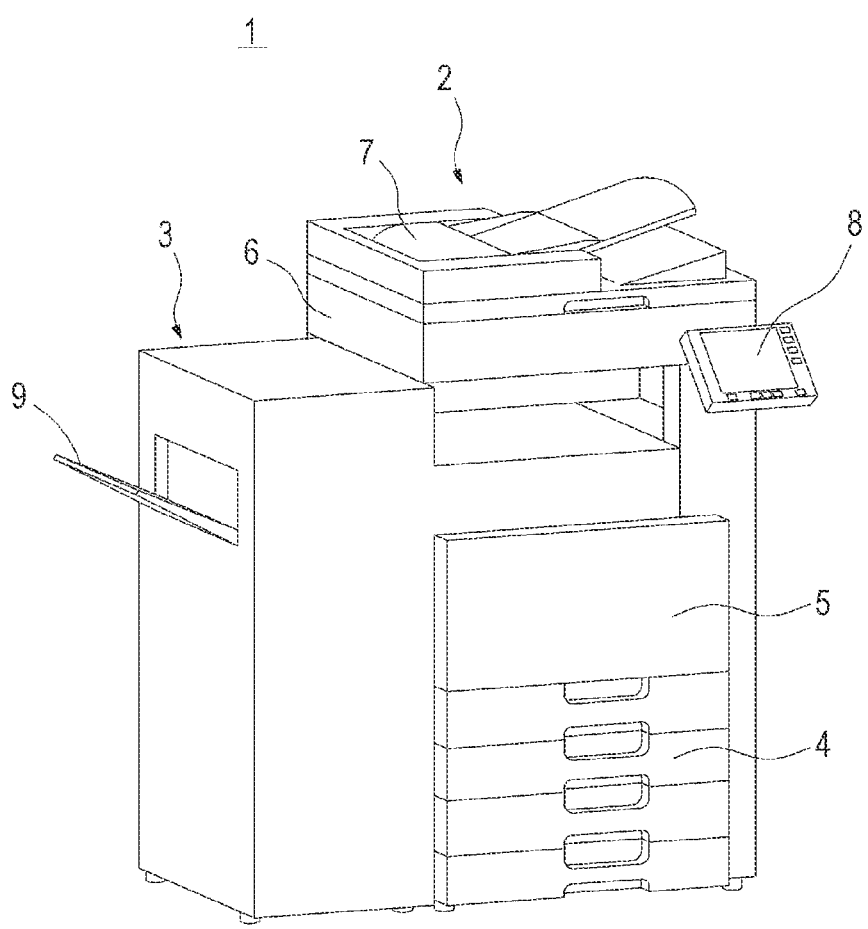
FIG. 1 is a view illustrating an exemplary external configuration of an image forming apparatus.

FIG. 1 is a view illustrating an exemplary external configuration of an image forming apparatus 1 according to the present embodiment. The image forming apparatus 1 is, for example, an apparatus serving as a multifunction peripheral (MFP), and includes an apparatus main body 2 having a scan function and a print function and a post-processing unit 3 assembled to the apparatus main body 2. The apparatus main body 2 includes a sheet feeder 4, an image former 5, an image reader 6, and an automatic document feeder (hereinafter referred to as "ADF") 7.

The sheet feeder 4 and the image former 5 operate in use of the print function of the image forming apparatus 1. The sheet feeder 4 feeds, one-by-one, sheets such as print sheets from a sheet feeding cassette specified by the user among a plurality of sheet feeding cassettes to the image former 5. The image former 5 forms an image onto a sheet fed from the sheet feeder 4 and conveys the sheet to the post-processing unit 3. For example, the image former 5 forms an image onto a sheet by electrophotography or inkjetting.

The image reader 6 and the ADF 7 operate in use of the scan function of the image forming apparatus 1. The ADF 7 automatically conveys, one-by-one, documents set by the user to the image reading position of the image reader 6. While a document conveyed by the ADF 7 is passing the image reading position, the image reader 6 optically reads an image of the document to generate image data. Further, the ADF 7 allows the upper face of the image reader 6 to be opened and closed. The image reader 6 can also read an image of the document placed on the platen glass provided on the upper face.

The post-processing unit 3 performs various types of post-processing on the sheet discharged from the image former 5. For example, the post-processing unit 3 is capable of forming a crease or a perforation onto a sheet with the image formed by the image former 5, or cutting the sheet into a size specified by the user. In addition, the post-processing unit 3 is capable of forming a punched hole into the sheet, or stapling a plurality of sheets to generate a bundle of sheets. The post-processing unit 3 discharges the sheet subjected to the post-processing specified by the user, onto a discharge tray 9. In a case where no post-processing to be performed is set by the user, the post-processing unit 3 does not perform post-processing on the sheet sent from the image former 5, and discharges the sheet as it is onto the discharge tray 9.

The image forming apparatus 1 further includes an operation panel 8 on the front face side of the apparatus main body 2. The operation panel 8 displays various operation screens operable by the user, and receives a setting operation by the user. For example, when a print object resulting in any of various forms such as a business card, a ticket, or a coupon is to be output, the user can set desired post-processing on the operation panel 8.

Figure 2:
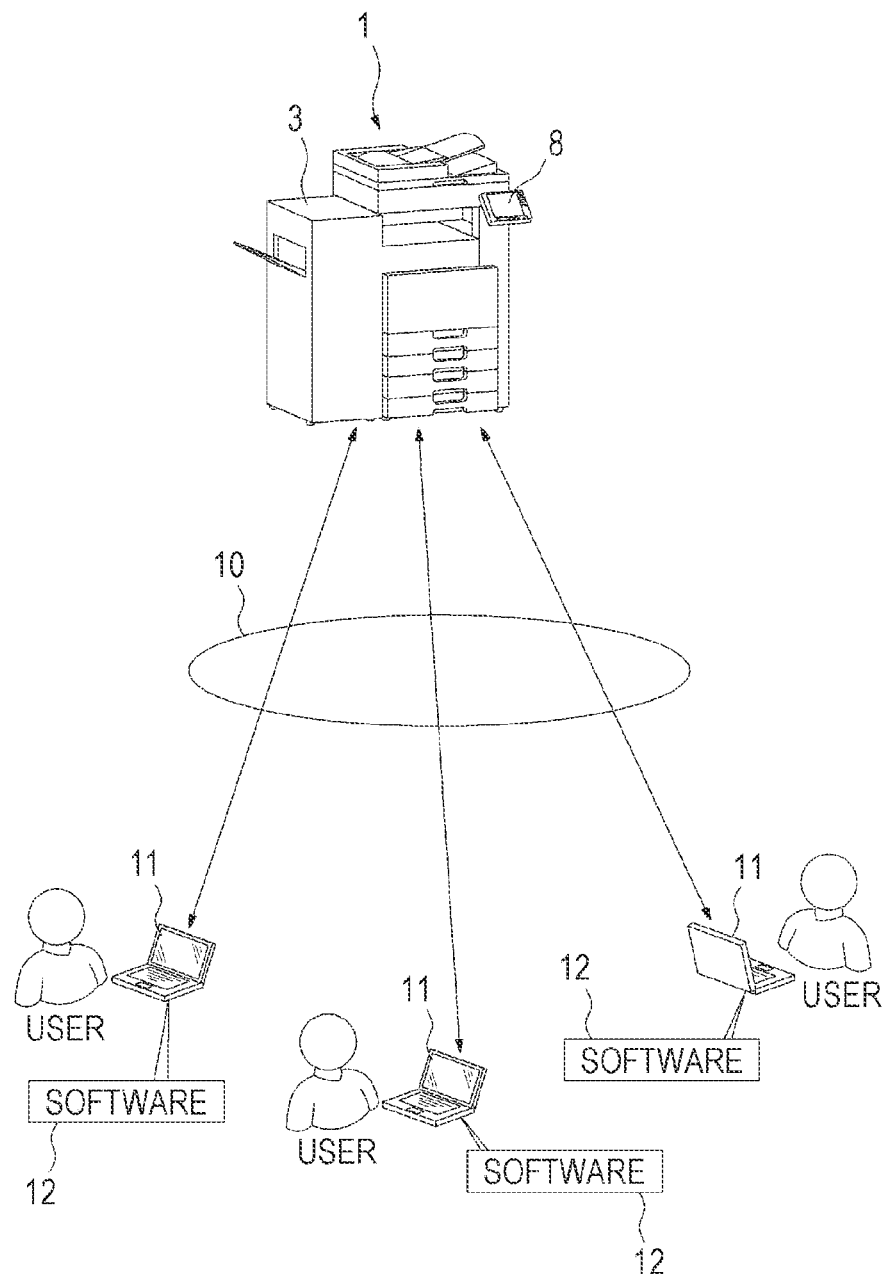
FIG. 2 illustrates an exemplary remote operation of the image forming apparatus.

The image forming apparatus 1 can also receive a remote operation by the user. FIG. 2 illustrates an exemplary remote operation of the image forming apparatus 1. As illustrated in FIG. 2, the image forming apparatus 1 is connected through a network 10 to an information processing device 11 used by its user. The network 10 is a communication network such as a local area network (LAN) or the Internet. The information processing device 11 serves as a personal computer or a tablet terminal, for example. A browser is installed on the information processing device 11. In response to an access to the image forming apparatus 1 by the user after activating the browser on the information processing device 11, the same screen as the operation screen displayed on the operation panel 8 of the image forming apparatus 1 is displayed on the information processing device 11. Thus, the user can perform a setting operation on the operation screen displayed on the information processing device 11 to set the image forming apparatus 1. For example, the user can perform an operation with the information processing device 11 similarly to the operation on the operation panel 8, and can also set desired post-processing.

The information processing device 11 further includes software 12 for the user to create or edit print content. The software 12 enables creating or editing various types of print content such as a business card, a ticket, and a coupon, and is capable of generating print content with characters, images, and others designed freely. Representative examples of such software 12 include Illustrator (registered trademark) of Adobe. Illustrator (registered trademark) of Adobe enables display of a reference image in superimposition on a layer different from a layer to be subjected to design editing. In designing of print content, the user can perform the design work while referring to the reference image. Note that the software 12 of the present embodiment is not limited to Illustrator (registered trademark) of Adobe.

When the user activates the software 12 on the information processing device 11 to design print content, the image forming apparatus 1 of the present embodiment generates image data in which a post-processing position specified by the user has been drawn such that the image data in which the post-processing position for the post-processing unit 3 has been drawn as a reference image can be displayed on the editing screen by the software 12. Hereinafter, such an image forming apparatus 1 will be described in detail.

Figure 3:
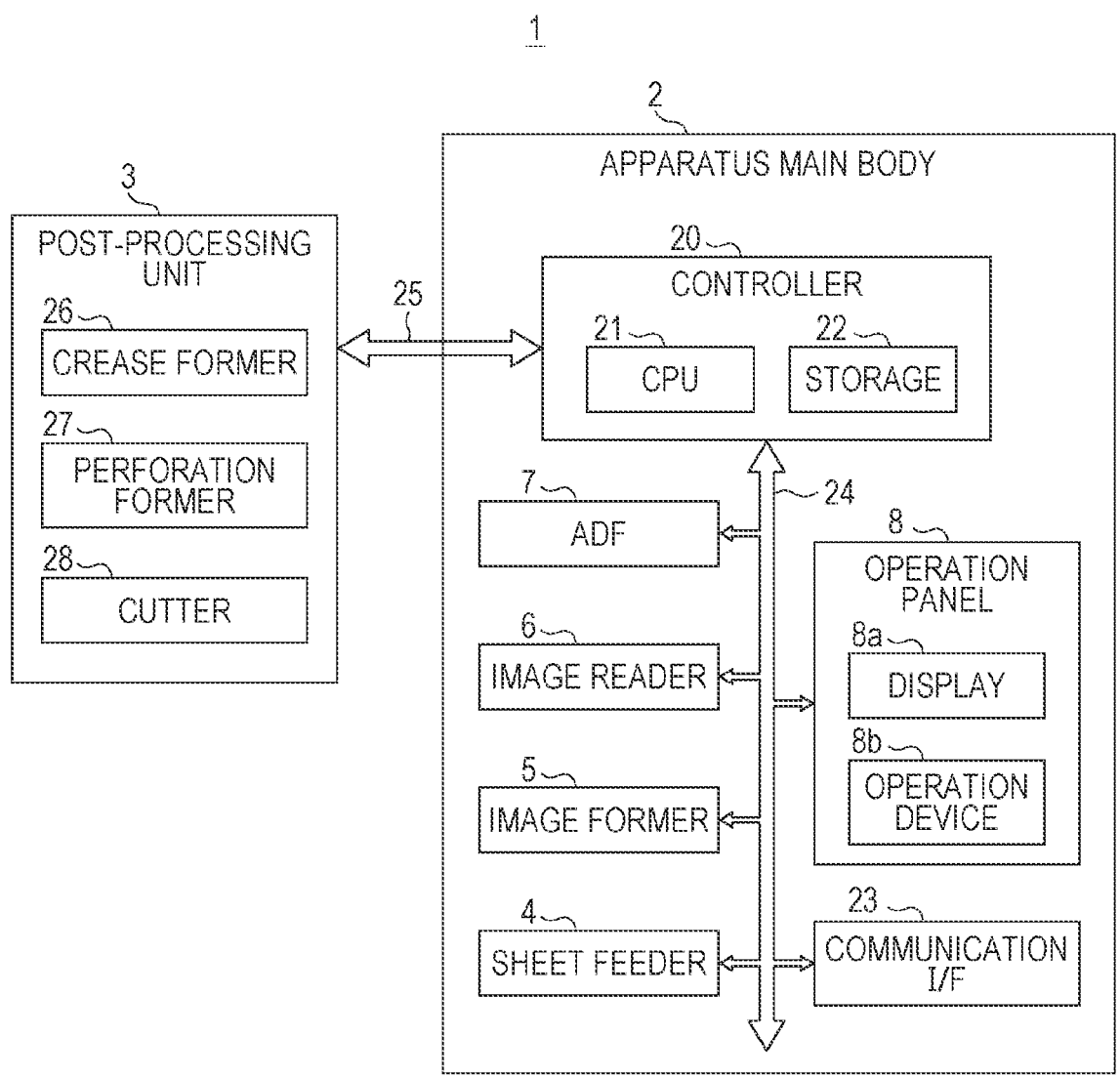
FIG. 3 is a diagram illustrating an exemplary hardware configuration of the image forming apparatus.

FIG. 3 is a diagram illustrating an exemplary hardware configuration of the image forming apparatus 1; As illustrated in FIG. 3, the image forming apparatus 1 includes a controller 20 and a communication interface 23 in addition to the sheet feeder 4, the image former 5, the image reader 6, the ADF 7, and the operation panel 8 in the apparatus main body 2. The controller 20 controls the operation of the image forming apparatus 1, and is connected to each element inside the apparatus main body 2 through a bus 24. The controller 20 also controls the operation of the post-processing unit 3, and is connected to the post-processing unit 3 through a bus 25. The controller 20 includes a central processing unit (CPU) 21 and a storage 22. The CPU 21 is a hardware processor and executes a predetermined program. The storage 22 is a storage device including a hard disk drive (HDD) or a solid state drive (SSD), and stores programs executed by the CPU 21, various pieces of information and data, and others.

The operation panel 8 includes a display 8a and an operation device 8b. The display 8a is a display device that displays an operation screen operable by the user, and includes, for example, a liquid crystal display. The operation device 8b is a device that detects an input operation by the user, and includes, for example, a touch panel key and a push button key.

The communication interface 23 is an interface for the image forming apparatus 1 to communicate with the information processing device 11 through the network 10. For example, the communication interface 23 includes a network interface card (NIC).

The post-processing unit 3 includes a crease former 26, a perforation former 27, and a cutter 28.

The crease former 26 forms a crease such as a V-shaped crease or an inverse V-shaped crease on a sheet conveyed from the image former 5. Such crease forming by the crease former 26 is a type of the post-processing on the sheet described later. The crease former 26 forms a cease such as a V-shaped crease or an inverse V-shaped crease at a position specified by the user. However, there is a restriction on a position (post-processing position) where the crease former 26 can perform crease forming on the sheet. Thus, when specifying a position for cease forming, the user specifies the position within a range in which the crease former 26 can perform the crease forming.

The perforation former 27 forms a perforation on a sheet conveyed from the image former 5. Such perforation forming by the perforation former 27 is a type of the post-processing on the sheet. The perforation former 27 forms a perforation at a position specified by the user. However, there is a restriction on a position (post-processing position) where the perforation former 27 can form a perforation on the sheet. Thus, when specifying a position for perforation forming, the user specifies the position within a range in which the perforation former 27 can form the perforation.

The cutter 28 cuts a sheet conveyed from the image former 5. Such cutting by the cutter 28 is a type of the post-processing on the sheet. The cutter 28 cuts the sheet at a position specified by the user. However, there is a restriction on a position (post-processing position) where the cutter 28 can cut the sheet. Thus, when specifying a position for cutting, the user specifies a range in which the cutter 28 can perform the cutting.

Prior to execution of a job such as a print job, the controller 20 receives a job setting operation by the user. For example, in the case of a print job, the controller 20 receives a setting operation as to whether or not the post-processing unit 3 performs post-processing such as crease forming, perforation forming, or cutting. At this time, the controller 20 determines whether or not the post-processing position specified by the user is set within a range where the post-processing unit 3 can perform the post-processing. In a case where the post-processing position specified by the user is set within a range where the post-processing can be performed, the controller 20 determines the post-processing setting specified by the user as a valid setting. Otherwise, in a case where the post-processing position specified by the user is set out of the range where the post-processing can be performed, the controller 20 determines the post-processing setting specified by the user as an invalid setting, and displays, for example, a notice to prompt the user to perform re-setting for post-processing. Thus, the user cannot set, as a post-processing position, a position where the post-processing unit 3 cannot perform post-processing.

The controller 20 can receive such a setting operation as described above through the operation panel 8 and can also receive the setting operation by a remote operation from the information processing device 11. Further, in a case where the controller 20 determines that the post-processing position specified by the user is a valid setting, image data in which the post-processing position has been drawn is generated after the determination, and the image data is output to the information processing device 11 used by the user. Hereinafter, such a controller 20 will be described in detail.

Figure 4:
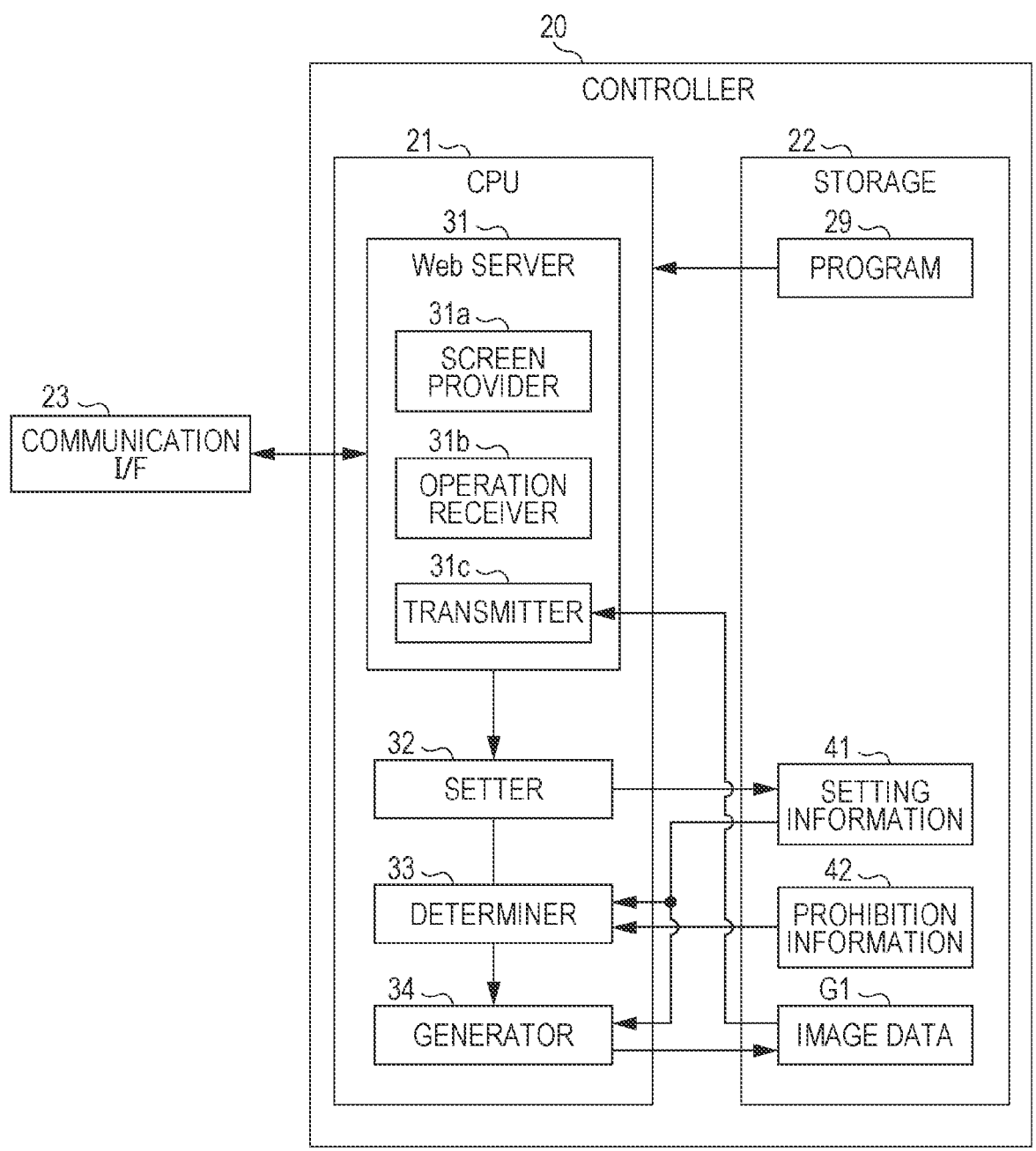
FIG. 4 is a diagram illustrating an exemplary functional configuration of a controller.

FIG. 4 is a diagram illustrating an exemplary functional configuration of the controller 20. FIG. 4 mainly illustrates an exemplary configuration in which the controller 20 operates in response to a remote operation from the information processing device 11. As illustrated in FIG. 4, the CPU 21 of the controller 20 reads and executes a program 29 stored in the storage 22 to function as a web server 31, a setter 32, a determiner 33, and a generator 34.

The web server 31 is a server that communicates with a browser activated on the information processing device 11, and provides a user interface for the user to remotely operate the image forming apparatus 1 with the information processing device 11. The web server 31 includes a screen provider 31a, an operation receiver 31b, and a transmitter 31c.

The screen provider 31a provides the same operation screen as the operation screen displayed on the display 8a of the operation panel 8 to the browser on the information processing device 11. For example, when detecting an access from the browser, the screen provider 31a converts screen information displayed on the display 8a of the operation panel 8 into a hyper text markup language (HTML) format to provide the screen information to the browser. As a result, the information processing device 11 can display the same operation screen as the operation screen on the operation panel 8 by the browser. The user can operate the operation screen to remotely operate the image forming apparatus 1.

The operation receiver 31b acquires operation information from the browser on the information processing device 11. That is, in response to a setting operation on the operation screen provided by the screen provider 31a, the operation receiver 31b acquires operation information indicating the details of operation. The operation receiver 31b acquires the operation information from the browser on the information processing device 11, and then outputs the operation information to the setter 32.

The setter 32 performs job setting processing on the basis of the operation information acquired by the operation receiver 31b. The setter 32 generates setting information 41 indicating the details of job setting, on the basis of the setting information acquired from the browser. Then, the setter 32 stores the setting information 41 in the storage 22.

FIG. 5 illustrates exemplary setting information 41. For example, in a case where the user specifies to perform post-processing by the post-processing unit 3, the post-processing position specified by the user is recorded in the setting information 41 as illustrated in FIG. 5. For example, in a case where the user specifies to perform crease forming, perforation forming, and cutting by the post-processing unit 3, the crease forming position, the perforation forming position, and the cutting position specified by the user are each recorded in the setting information 41 as illustrated in FIG. 5. In addition, in a case where the post-processing unit 3 can form a punch hole in the sheet, the punch-hole forming position is recorded in the setting information 41.

Storing of such setting information 41 in the storage 22 enables the controller 20 to read and reflect the setting information 41 stored in the storage 22 in execution of a job. Thus, the user can perform a setting operation for the image forming apparatus 1 in advance, not only immediately before execution of a job with the image forming apparatus 1.

The determiner 33 determines whether or not the details of job setting set by the setter 32 are executable by the image forming apparatus 1. For example, prohibition information 42 defining the ranges of various setting values not executable by the image forming apparatus 1 including the post-processing unit 3 is stored in advance in the storage 22. FIG. 6 illustrates exemplary prohibition information 42. The prohibition information 42 is information defining a restriction for the user to perform a setting operation, and a setting prohibition range is registered for each setting item settable by the user. For example, as a crease forming position for the post-processing unit 3, the range of 0 to 9 mm from one end of the sheet is defined as the setting prohibition range. Further, a setting prohibition range is defined for each of a perforation forming and a cutting position. In addition, in a case where the post-processing unit 3 can form a punch hole in the sheet, a setting prohibition range regarding a punch-hole forming position is registered in the prohibition information 42.

The determiner 33 determines whether or not the setting value (post-processing position) recorded in the setting information 41 is a value set within the setting prohibition range in the prohibition information 42 to determine whether or not the post processing with the setting value is executable by the post-processing unit 3. As a result, in a case where the setting value recorded in the setting information 41 is set out of the setting prohibition range, the determiner 33 holds the setting value recorded in the setting information 41 as a valid setting. Otherwise, in a case where the setting value recorded in the setting information 41 is a value set within the setting prohibition range, the determiner 33 determines that the setting value is not a setting value with which the post processing is executable by the image forming apparatus 1 and the post-processing unit 3. The determiner 33 deletes the setting value from the setting information 41, and displays, for example, a cautionary notice to the user through the web server 31 to prompt re-setting for post-processing.

Further, in a case where the setting value recorded in the setting information 41 is the valid setting, the determiner 33 causes the generator 34 to function. That is, in a case where the setting value recorded in the setting information 41 is set within the setting prohibition range and is an invalid setting, the determiner 33 does not cause the generator 34 to function, but causes the generator 34 to function in a case where the setting value recorded in the setting information 41 is a valid setting.

The generator 34 generates image data in which the post-processing position specified by the user has been drawn. That is, the generator 34 generates a sheet image corresponding to the sheet size specified by the user, and applies, a line drawing corresponding to the type of post-processing to the post-processing position specified by the user in the sheet image, thereby generating image data in which the post-processing position has been drawn.

Figure 7:
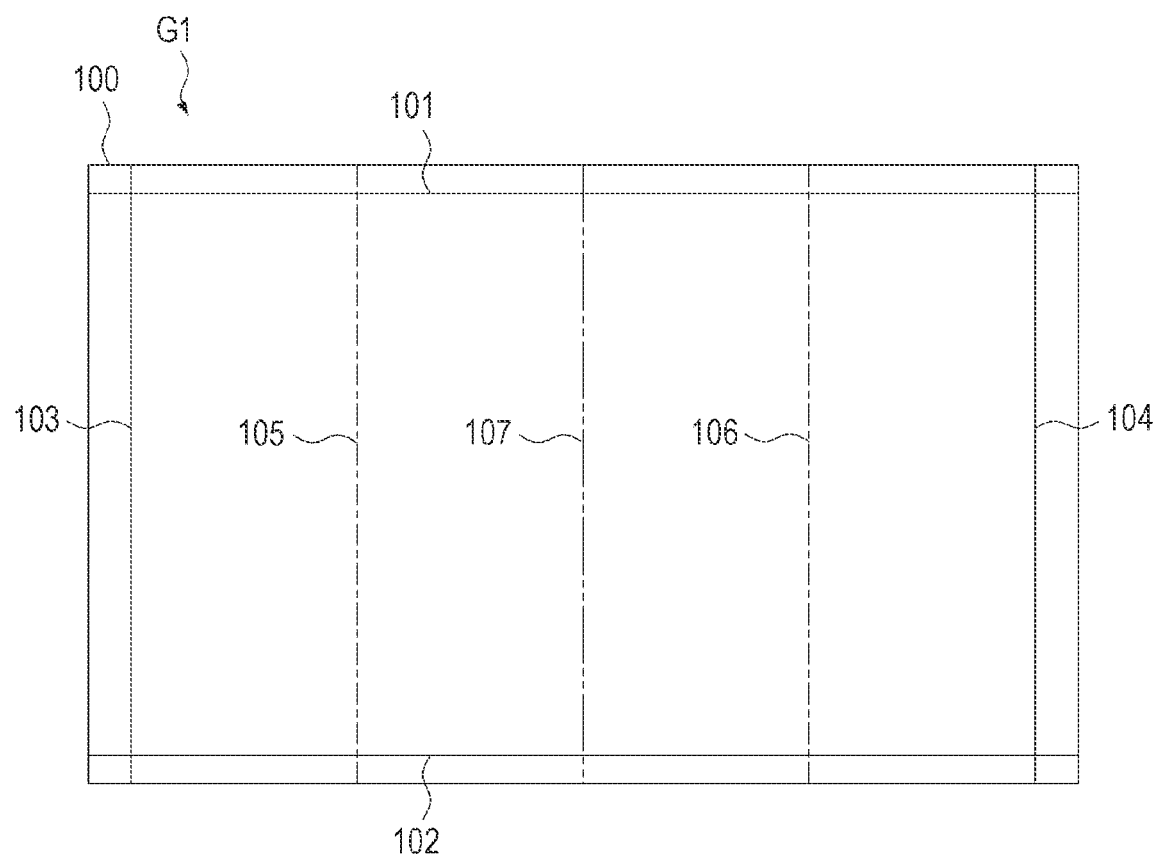
FIG. 7 illustrates exemplary image data generated by a generator.

FIG. 7 illustrates exemplary image data G1 generated by the generator 34. The image data G1 includes a sheet image 100 corresponding to the sheet size specified by the user. The sheet image 100 is, for example, an image having an entire face in white or transparent, and is an image having the same size as the sheet size specified by the user. The image data G1 is generated as an image in superimposition of images 101 to 107 each indicating the corresponding post-processing position specified by the user on the sheet image 100. For example, the images 101 to 104 are each an image drawn by a solid line, and are each an image indicating the cutting position for the sheet. Further, the images 105 and 106 are each an image drawn by a one-dot chain line, and are each an image indicating a crease forming position for crease forming on the sheet. Furthermore, the image 107 is an image drawn by a two-dot chain line, and is an image indicating a perforation forming position for perforation forming on the sheet. In such a manner, the generator 34 generates image data G1 in which images different in type of post-processing specified by the user are added to the corresponding post-processing positions specified by the user on the sheet image 100. After generating the image data G1 in which the post-processing positions have been drawn, the generator 34 stores the image data G1 in the storage 22.

When generating such image data G1, the generator 34 generates the image data G1 in a data format allowing display of the image data G1 by the software 12 installed on the information processing device 11. For example, Illustrator (registered trademark) of Adobe enables display of the image data G1 in PDF format as a reference image in superimposition on a layer different from a layer to be subjected to design editing. Thus, the generator 34 generates the image data G1 in PDF format. However, the data format of the image data G1 generated by the generator 34 is not limited to the PDF format. For example, in a case where the software 12 for creating or editing print content can display image data in JPEG, TIFF, or bitmap format, the generator 34 generates image data G1 in JPEG, TIFF, or bitmap format.

Further, the generator 34 can generate image data G1 in a plurality of data formats, and may generate image data G1 in a data format specified by the user from among the plurality of data formats. In such a case, the user can select, by himself or herself, the data format allowing display of the image data G1 by the software 12 for creating or editing the print content.

Furthermore, the generator 34 may generate image data G1 in a data format identical to a data format of data generated by the software 12. For example, because Illustrator (registered trademark) of Adobe generates AI data with an extension "ai", the generator 34 may generate image data G1 as AI data.

The transmitter 31c of the web server 31 functions in response to, by the user, specifying of download of the image data G1. The transmitter 31c reads the image data G1 from the storage 22, and transmits the image data G1 to the information processing device 11 through the communication interface 23. As a result, the user can take the image data G1 in which the post-processing position specified by the user has been drawn, into the information processing device 11. That is, prior to designing a print object, the user can take the image data G1 in which a desired post-processing position has been drawn, into the information processing device 11 of the user. Thereafter, when the user activates the software 12 on the information processing device 11 to perform editing work of print content, the user reads the image data G1 with the software 12 and causes the image data G1 to be displayed on a layer different from the layer to be subjected to design editing. As a result, the user can proceed with the editing work of the print object while confirming the post-processing position set by the user.

Figure 8:
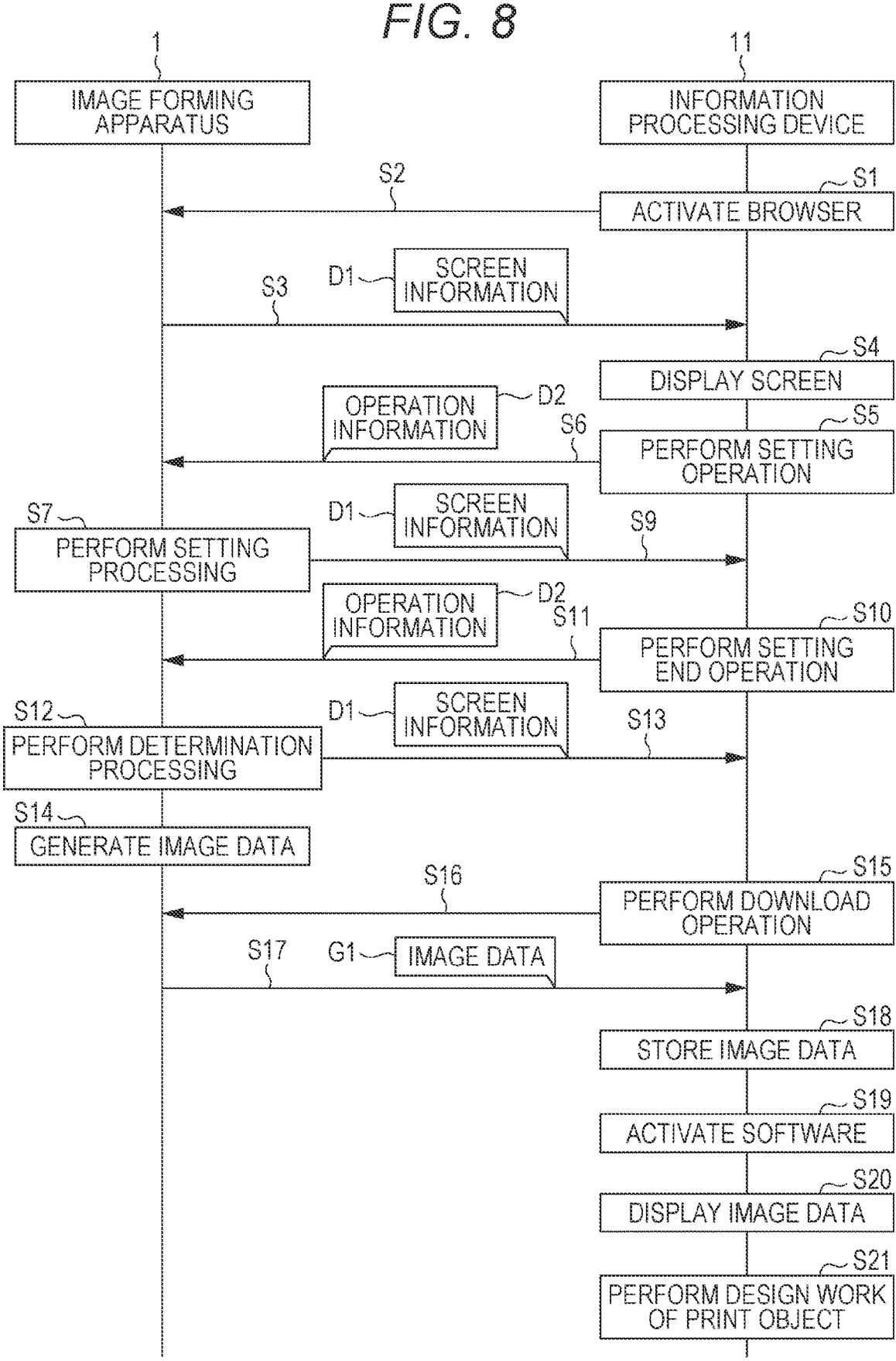
FIG. 8 is a flowchart illustrating a flow of a processing procedure by the image forming apparatus and an information processing device in editing work of a print object by a user.

FIG. 8 is a flowchart illustrating a flow of a processing procedure by the image forming apparatus 1 and the information processing device 11 in editing work of a print object by the user. First, the information processing device 11 activates a browser on the basis of an operation by the user (step S1), and accesses the image forming apparatus 1 (step S2). When detecting the access from the browser on the information processing device 11, the image forming apparatus 1 generates screen information D1 and transmits the screen information D1 to the information processing device 11 (step S3). When acquiring the screen information D1 from the image forming apparatus 1, the information processing device 11 displays a screen based on the screen information D1 (step S4). As a result, an operation screen for remotely operating the image forming apparatus 1 is displayed on the information processing device 11. When the user performs a setting operation on the operation screen (step S5), the browser transmits operation information D2 to the image forming apparatus 1 (step S6). On the basis of the operation information D2 from the browser, the image forming apparatus 1 performs setting processing for reflecting the setting by the user (step S7). As a result, setting information 41 is generated in the image forming apparatus 1 and stored in the storage 22. Then, in order to update the operation screen of the information processing device 11, the image forming apparatus 1 transmits screen information D1 again to the information processing device 11 (step S9). As a result, the operation screen displayed on the information processing device 11 is updated to a screen reflecting the user's setting. In repetition of an operation on the operation screen by the user, the processing of steps S5 to S9 is repeated. In such a case, the setting information 41 stored in the storage 22 is consecutively updated each time the user performs an operation.

Figure 9:
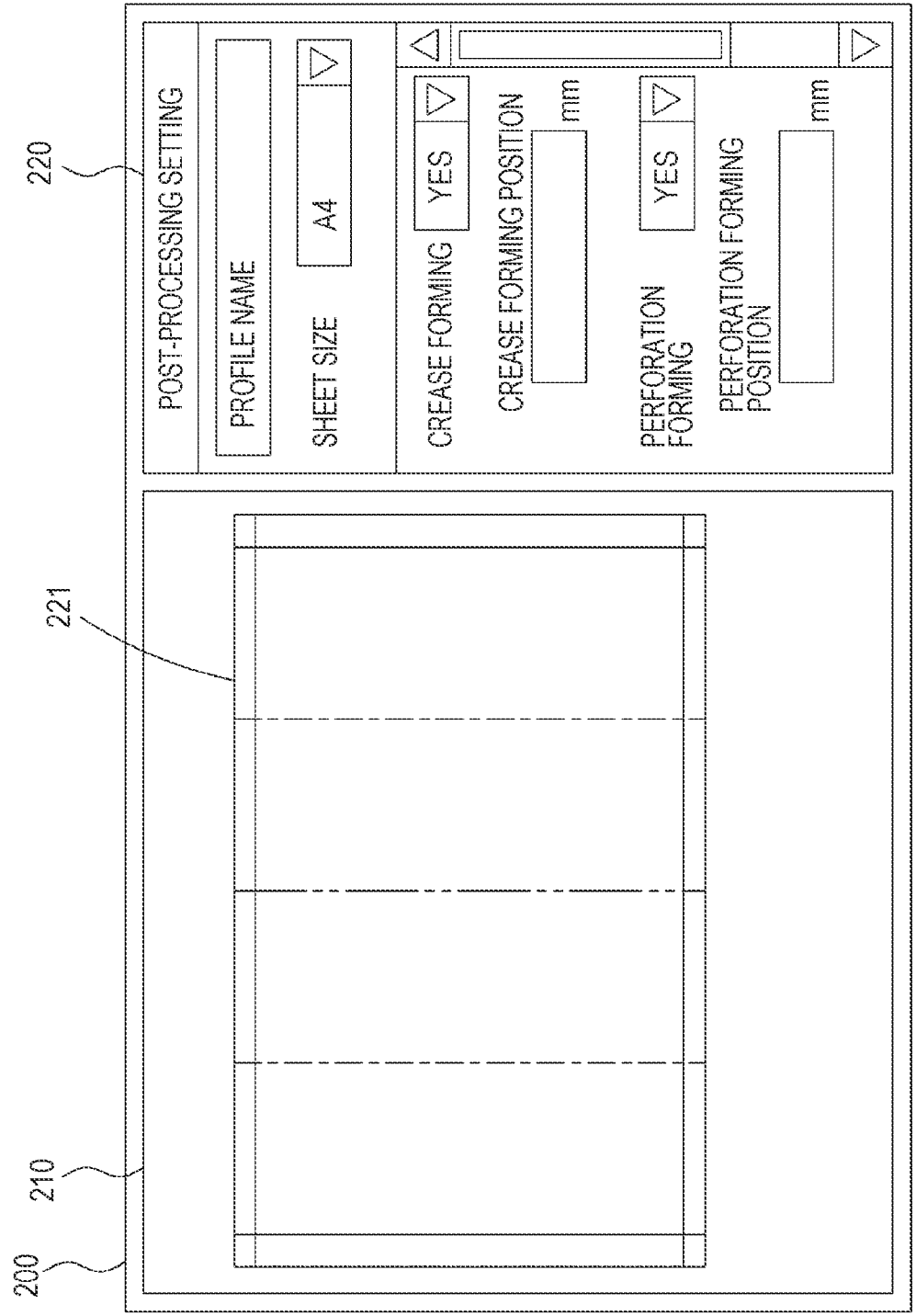
FIG. 9 illustrates an exemplary operation screen displayed on the information processing device.

FIG. 9 illustrates an exemplary operation screen 200 displayed on the information processing device 11. Note that FIG. 9 illustrates an exemplary screen for setting post-processing to the post-processing unit 3 of the image forming apparatus 1. The operation screen 200 includes an image display field 210 and an operation field 220 for the user to perform a setting operation relating the post-processing. For example, when the user inputs a profile name in the upper part of the operation field 220 and specifies a sheet size, a sheet image 221 corresponding to the sheet size specified by the user is displayed in the image display field 210. Thereafter, when the user specifies crease forming as the post-processing, an image indicating the crease forming is added to the crease forming position specified by the user on the sheet image 221. Further, when the user specifies perforation forming as the post-processing, an image indicating the perforation forming is added to the perforation forming position specified by the user on the sheet image 221. Furthermore, when the user specifies cutting as the post-processing, an image indicating the cutting is added to the cutting position specified by the user on the sheet image 221. As a result, the user can confirm the details of setting specified by the user, with the sheet image 221 displayed in the image display field 210.

Then, when the user intends to end the setting operation, the user performs a setting end operation (step S10). When detecting the setting end operation by the user, the browser transmits operation information D2 indicating the end of setting to the image forming apparatus 1 (step S11). As a result, the image forming apparatus 1 grasps that the end of setting operation by the user.

In response to the end of setting operation by the user, the image forming apparatus 1 reads the setting information 41 stored in the storage 22, and determines whether or not the details of setting specified by the user is executable by the image forming apparatus 1 (step S12). In particular, in a case where the setting information 41 includes a setting for post-processing, the image forming apparatus 1 determines whether or not the post-processing position specified by the user is set within a range in which the post-processing unit 3 can perform the post processing. Then, the image forming apparatus 1 generates screen information D1 indicating the determination result, and transmits the screen information D1 to the information processing device 11 (step S13). As a result, the operation screen displayed on the information processing device 11 is updated, and the user can confirm whether or not the details of setting specified by the user is executable by the image forming apparatus 1.

Figure 10A:
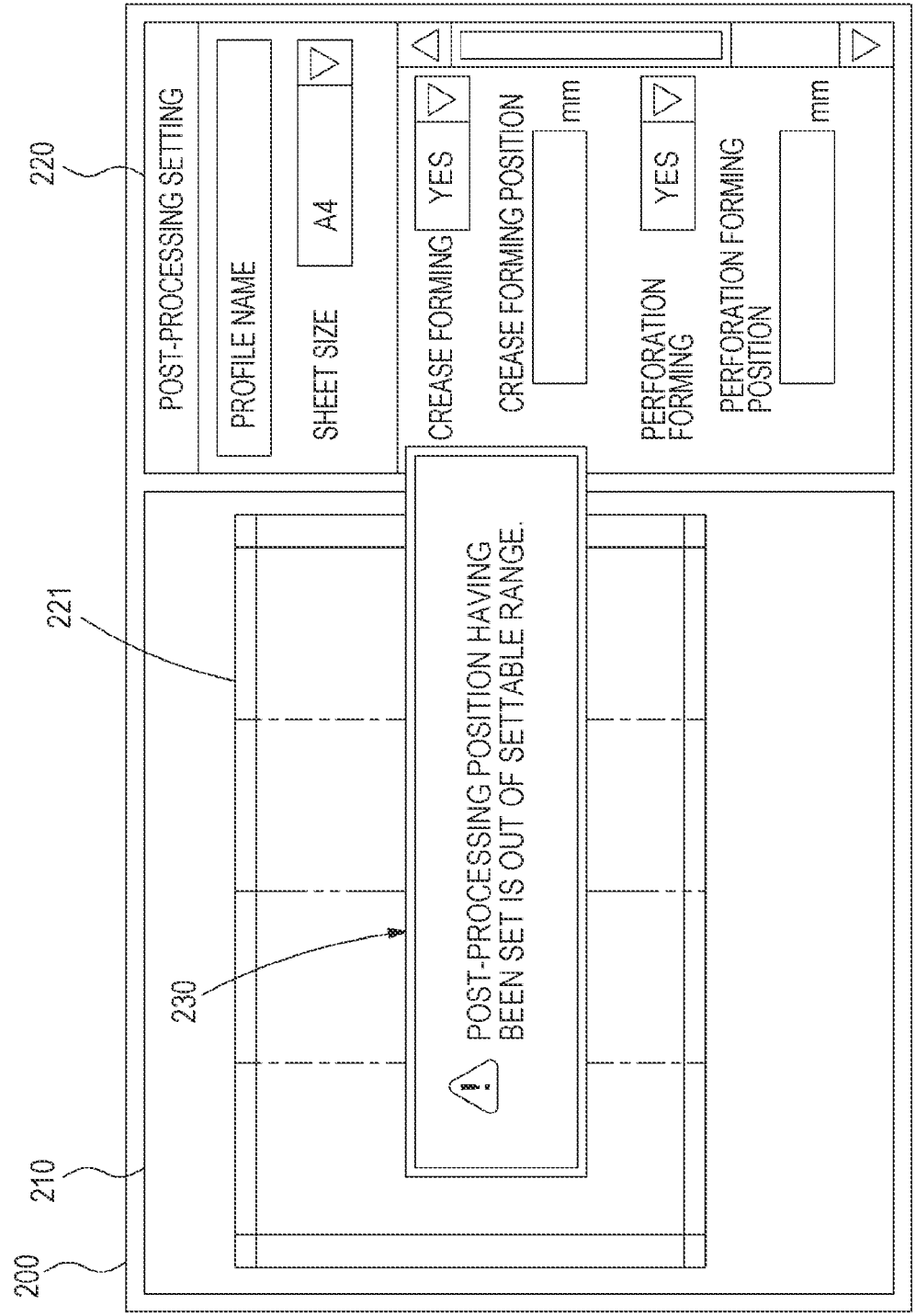

FIGS. 10A and 10B each illustrate another exemplary operation screen 200 displayed on the information processing device 11. For example, in a case where the post-processing position specified by the user is not a position where the post-processing unit 3 can perform the post-processing, the information processing device 11 displays such a pop-up screen 230 as illustrated in FIG. 10A. The pop-up screen 230 is a screen indicating to the user that the post-processing position having been set is out of the settable range. Thus, the user can grasp that the specified post-processing position is a position where the post-processing unit 3 cannot perform the post-processing. Thereafter, the user can perform a re-setting operation for the post-processing to change the setting to an appropriate post-processing position.

Otherwise, in a case where the post-processing position specified by the user is a position where the post-processing unit 3 can perform the post-processing, the information processing device 11 displays such a pop-up screen 240 as illustrated in FIG. 10B. The pop-up screen 240 is a screen notifying the user that the image in which the post-processing position has been drawn can be downloaded. The pop-up screen 240 includes a download button 241 operable by the user. Thus, the user can grasp that the specified post-processing position is a position where the post-processing unit 3 can perform the post processing, and may operate the download button 241 when desiring to download the image data G1 in which the post-processing position has been drawn.

Referring back to FIG. 8, in a case where the image forming apparatus 1 determines that the details of setting specified by the user is executable by the image forming apparatus 1 in the determination processing (step S12), the image forming apparatus 1 generates image data G1 in which the post-processing position specified by the user has been drawn (step S14). At this time, the image forming apparatus 1 generates the image data G1 on the basis of the sheet image 221 displayed on the information processing device 11. The image forming apparatus 1 generates the image data G1 in a data format allowing display of the image data G1 by the software 12 of the information processing device 11. For example, the image forming apparatus 1 may generate the image data G1 in a predetermined data format such as PDF format, or may generate the image data G1 in a data format specified when the user operates the download button 241. Then, the image forming apparatus 1 stores the image data G1 in the storage 22.

When the user operates the download button 241 while such a pop-up screen 240 as illustrated in FIG. 10B is displayed on the information processing device 11 (step S15), the browser transmits a download request to the image forming apparatus 1 (step S16). When receiving the download request from the information processing device 11, the image forming apparatus 1 reads the image data G1 from the storage 22 and transmits the image data G1 to the information processing device 11 (step S17). In a case where the data format of the image data G1 has been specified in the download request, the image forming apparatus 1 may generate the image data G1 in the data format specified in the download request, and may transmit the image data G1 to the information processing device 11.

When receiving the image data G1 from the image forming apparatus 1, the information processing device 11 stores the image data G1 (step S18). Thereafter, the user starts design work of the print object. That is, the user activates the software 12 on the information processing device 11 (step S19), and causes the information processing device 11 to display a screen for creating or editing print content on the information processing device 11. Then, the user causes the image data G1 downloaded and acquired from the image forming apparatus 1 to be displayed as a reference image in superimposition on a layer different from a layer to be subjected to design editing (step S20). With the image data G1 displayed in superimposition, the user performs the design work of the print object (step S21).

Thus, after specifying the post-processing position where the post-processing can be performed in the image forming apparatus 1, the user can lay out the print content on the sheet while visually recognizing the image data G1 in which the post-processing position has been drawn. At this time, for example, the user can lay out the print content such that important images, characters, and others included in the print content do not overlap the post-processing position. As a result, the user can efficiently perform the work without redoing the design.

As described above, the image forming apparatus 1 of the present embodiment includes the setter 32 that sets a post-processing position to a sheet; the determiner 33 that determines whether or not the post-processing position is processable by the post-processing unit 3; and the generator 34 that generates, when the determiner 33 determines that the post-processing position is processable, image data G1 in which the post-processing position to the sheet has been drawn. When generating the image data G1, the generator 34 generates the image data G1 in a data format allowing display of the image data G1 by the software 12 for creating or editing print content. With such an image forming apparatus 1, before starting design work, the user can operate the image forming apparatus 1 to set a post-processing position processable by the post-processing unit 3, and can acquire in advance image data G1 in which the post-processing position has been drawn. When the user performs the design work of a print object, the image data G1 acquired from the image forming apparatus 1 is displayed by the software 12, whereby the user can perform the design work while confirming the post-processing position. As a result, the number of times of redoing of the design work can be reduced unlike the conventional art.

Figure 11:
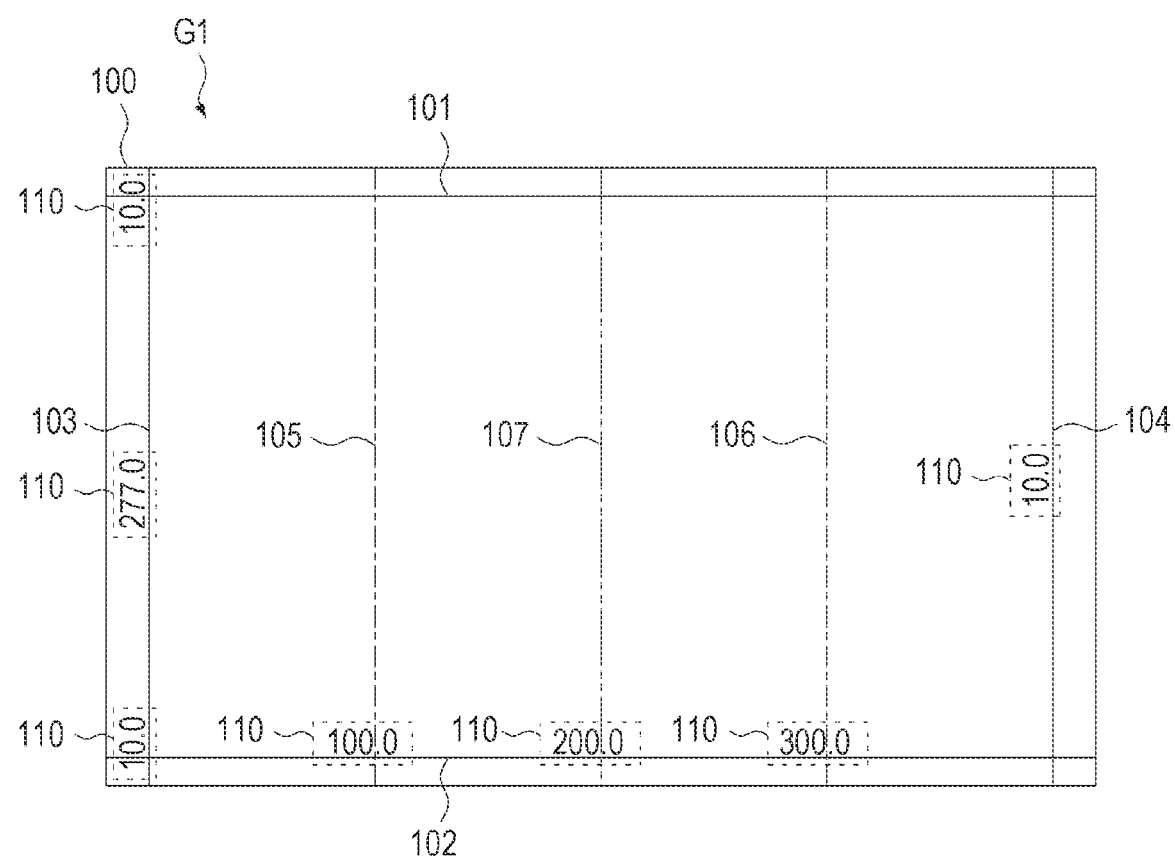
FIG. 11 illustrates exemplary image data with dimensional information added.

When generating the image data G1, the generator 34 may add, to the image data G1, dimensional information between a predetermined position on the sheet and the post-processing position. FIG. 11 illustrates exemplary image data G1 with dimensional information 110 added. For example, in a case where the user sets crease forming, perforation forming, and cutting, the generator 34 adds the dimensional information 110 regarding the crease forming position, the perforation forming position, and the cutting position set by the user to the corresponding positions near the images 101 to 107 as illustrated in FIG. 11. As a result, the user can grasp the dimension of the post-processing position when performing design work. For example, when the software 12 is software that imposes a plurality of images on a single sheet, some types of the software 12 receive a numerical value input by the user to perform imposition. In the case of such software, if the dimensional information 110 is added to the image data G1, the user can input a numerical value on the basis of the dimensional information 110. Thus, the image data G1 is improved in convenience.

When adding the dimensional information 110 to the image data G1, the generator 34 preferably draws the post-processing position and the dimensional information 110 in different colors in the image data G1. As a result, when the image data G1 is displayed, the post-processing position and the dimensional information 110 can be distinguished easily.

Further, in response to specifying of addition of the dimensional information 110 by the user, the generator 34 may add the dimensional information 110 to the image data G1. In such a case, it is more preferable that the user can select whether or not the dimensional information 110 is to be added for each type of post-processing.

Second Embodiment

Next, a second embodiment of the present invention will be described. In the first embodiment, an example has been described in which the image forming apparatus 1 generates image data G1 in which a post-processing position has been drawn, and transmits the image data G1 to the information processing device 11 used by the user. However, the user performs the setting operation of the post-processing position before starting design work of a print object. Thus, the job is not executed by the image forming apparatus 1 immediately after the setting operation by the user. Further, with the spread of telework in recent years, for example, it is also assumed that a user performs design work of a print object at home work. In such design work at home, it is sufficient that the information processing device 11 can cause the image forming apparatus 1 to display an operation screen for setting a post-processing position, which eliminates an access to the image forming apparatus 1 from the information processing device 11. Therefore, in the present embodiment, described will be an example in which an image data generating apparatus 300 different from the image forming apparatus receives an access from an information processing device 11 and generates image data G1 on the basis of a setting operation by the user.

Figure 12:
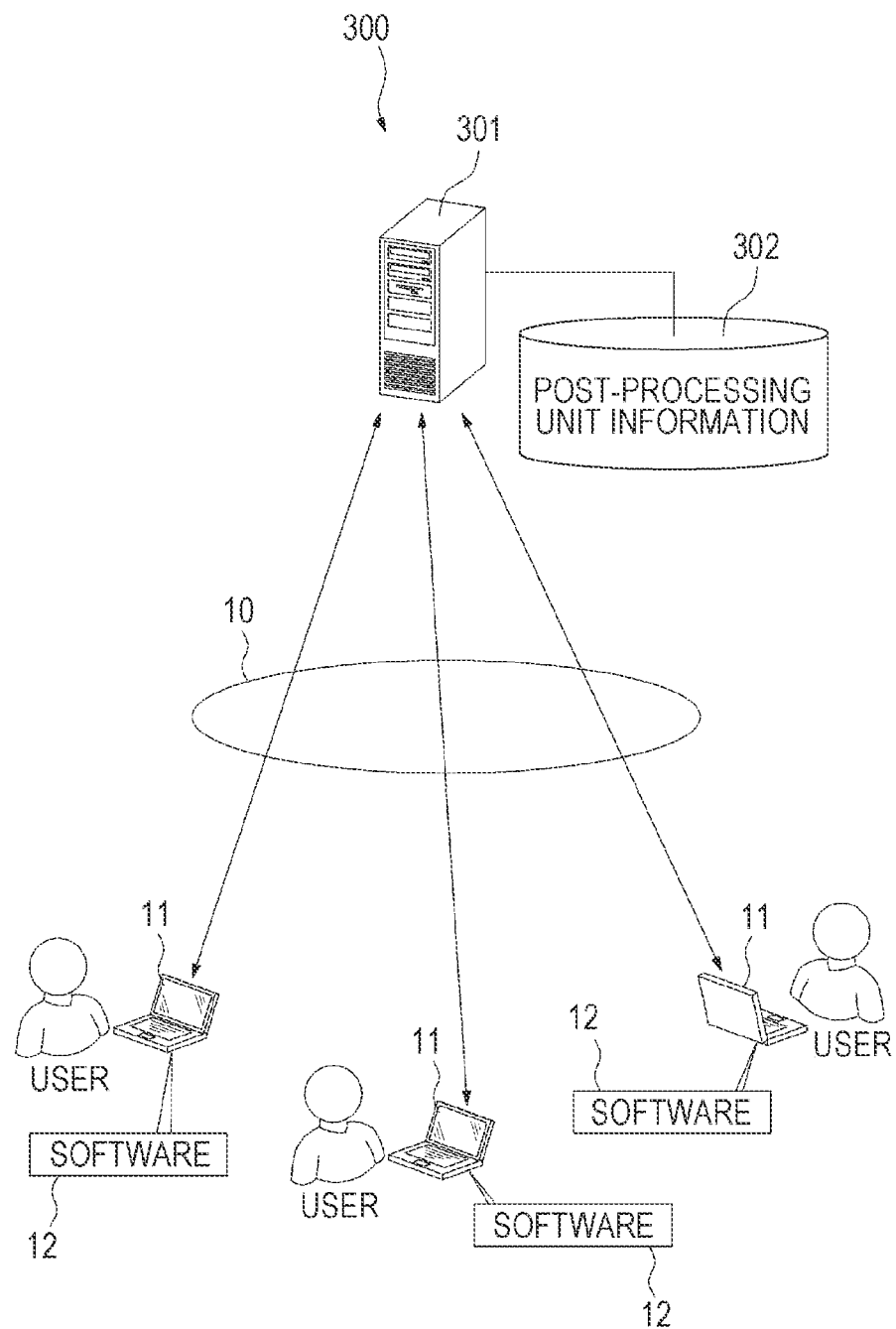
FIG. 12 illustrates an exemplary configuration in which an image data generating apparatus provides image data.

FIG. 12 illustrates an exemplary configuration in which the image data generating apparatus 300 provides the image data G1. The image data generating apparatus 300 includes a web server 301 installed on the Internet, for example. The web server 301 includes a database in which post-processing unit information 302 is stored. The post-processing unit information 302 is information in which the specifications and others of a plurality of types of post-processing units 3 are registered, and is information in which an operation screen for setting post-processing and prohibition information 42 are recorded for each type of post-processing units 3. In the web server 301, a program 29 similar to that of the first embodiment is installed in advance.

When detecting an access from the information processing device 11 through a network 10, the image data generating apparatus 300 provides an operation screen to the information processing device 11. The initial screen of the operation screen is a screen for selecting a single post-processing unit 3 from among the plurality of types of post-processing units 3. Thus, the image data generating apparatus 300 first receives an operation for specifying the post-processing unit 3 by the user. That is, the image data generating apparatus 300 includes a receiver that receives the specifying of the post-processing unit 3. Then, the image data generating apparatus 300 reads information regarding the post-processing unit 3 specified by the user from the post-processing unit information 302, and transmits an operation screen for performing a setting operation regarding post-processing to the information processing device 11. The information processing device 11 displays the operation screen, receives the setting operation by the user, and transmits operation information to the image data generating apparatus 300. As a result, the image data generating apparatus 300 can generate setting information 41 reflecting the post-processing setting specified by the user.

Thereafter, on the basis of a setting end operation by the user, the image data generating apparatus 300 determines whether or not the post-processing unit 3 can perform the post-processing at the post-processing position specified by the user. At this time, the image data generating apparatus 300 reads prohibition information 42 of the specified post-processing unit 3, and determines whether or not the post-processing position specified in the setting information 41 is set within the setting prohibition range. As a result, in a case where the post-processing can be performed, the image data generating apparatus 300 generates image data G1 in which the post-processing position specified by the user has been drawn, and transmits the image data G1 to the information processing device 11. Thus, the image data generating apparatus 300 can provide the image data G1 to the information processing device 11 before the user starts design work of a print object. Thereafter, when the user activates the software 12 on the information processing device 11 to perform editing work of print content, the user reads the image data G1 with the software 12 and causes the image data G1 to be displayed on a layer different from the layer to be subjected to design editing. As a result, the user can proceed with the editing work of the print object while confirming the post-processing position set by the user.

Unlike the image forming apparatus 1, the image data generating apparatus 300 of the present embodiment has no functions of forming an image and performing post-processing on a sheet, and thus receives a setting operation by the user to generate image data G1. Therefore, without a nearby image forming apparatus 1 to be used in output of a print object, the user can access the image data generating apparatus 300 to set desired post-processing. As a result, the user can acquire the image data G1 in which the post-processing position has been drawn.

Note that the detailed functions and operations in generation of the image data G1 by the image data generating apparatus 300 are similar to those described in the first embodiment.

(Modifications)

Several preferred embodiments of the present invention have been described above. The present invention, however, is not limited to the details described in the above embodiments, and thus various modifications are applicable.

In the first embodiment, an example has been described in which the user remotely operates the image forming apparatus 1 to download image data G1 onto the information processing device 11. The present invention, however, is not limited the example. For example, the user may operate the operation panel 8 of the image forming apparatus 1 to set a post-processing position. In this case, the image forming apparatus 1 may transmit image data G1 in which the post-processing position specified by the user has been drawn, to the information processing device 11 specified through the operation panel 8. Further, the image forming apparatus 1 may record the image data G1 in a recording medium such as a universal serial bus (USB) memory attached by the user.

In the embodiments, have been exemplified a crease forming position, a perforation forming position, and a cutting position as post-processing positions to be drawn in image data G1. Such a post-processing position is not limited to the crease forming position, the perforation forming position, or the cutting position, and thus the post-processing position may include any other post-processing positions. For example, the post-processing position may include a punch-hole forming position or may include a stapling position. Further, the post-processing position to be drawn in the image data G1 may be at least one of the plurality of types of post-processing positions.

The program 29 described in the embodiments is not limited to that installed in advance on the image forming apparatus 1 or the image data generating apparatus 300. That is, the program 29 may be installed later on the image forming apparatus 1 or the image data generating apparatus 300. In this case, the program 29 may be provided in a form of being recorded in a computer-readable recording medium such as a USB memory or a compact disc-read only memory (CD-ROM), or may be provided in a form that can be downloaded to a computer through, for example, the Internet.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising a hardware processor that:
   sets a post-processing position to a sheet;
   determines whether or not the post-processing position is processable on the sheet by a post-processing unit; and
   generates, when determining that the post-processing position is processable, image data in which the post-processing position to the sheet has been drawn,
   wherein the hardware processor generates the image data in a data format allowing display of the image data by software for creating or editing print content to be printed on the sheet without the image data.

2. The image forming apparatus according to claim 1, wherein when determining that the post-processing position is not processable, the hardware processor does not generate the image data.

3. The image forming apparatus according to claim 1, wherein the hardware processor further transmits the generated image data to an external information processing device.

4. The image forming apparatus according to claim 1, wherein the hardware processor is capable of generating the image data in a plurality of data formats, and generates the image data in a data format specified by a user from among the plurality of data formats.

5. The image forming apparatus according to claim 1, wherein the hardware processor generates the image data in a data format identical to a data format of data generated by the software.

6. The image forming apparatus according to claim 1, wherein the post-processing position includes at least one of a position for forming a crease, a position for forming a perforation, a position for cutting, or a position for forming a punch hole with respect to the sheet.

7. The image forming apparatus according to claim 1, wherein, when generating the image data, the hardware processor adds, to the image data, dimensional information between a predetermined position on the sheet and the post-processing position.

8. The image forming apparatus according to claim 7, wherein the hardware processor draws the post-processing position and the dimensional information in different colors in the image data.

9. The image forming apparatus according to claim 7, wherein in response to specifying of addition of the dimensional information by a user, the hardware processor adds the dimensional information to the image data.

10. The image forming apparatus according to claim 7, wherein
the post-processing position includes positions for a plurality of types of post-processing to the sheet, and
the hardware processor is capable of selecting whether or not the dimensional information is to be added for each of the plurality of types of post-processing.

11. An image data generating apparatus comprising a hardware processor that:
receives specifying of a post-processing unit;
sets a post-processing position to a sheet for the post-processing unit;
determines whether or not the post-processing position is processable on the sheet by the post-processing unit; and
generates, when determining that the post-processing position is processable, image data in which the post-processing position to the sheet has been drawn,
wherein the hardware processor generates the image data in a data format allowing display of the image data by software for creating or editing print content to be printed on the sheet without the image data.

12. A non-transitory recording medium storing a computer readable program causing a computer to perform:
setting a post-processing position to a sheet;
determining whether or not the post-processing position is processable on the sheet by a post-processing unit; and
generating, when the post-processing position is determined as processable by the determining, image data in which the post-processing position to the sheet has been drawn,
wherein the generating includes generating the image data in a data format allowing display of the image data by software for creating or editing print content to be printed on the sheet without the image data.

13. The image forming apparatus according to claim 1, wherein the hardware processor generates the image data in a data format allowing display of the image data by software for creating or editing print content while the image data is displayed with the print content.

14. The image data generating apparatus according to claim 11, wherein the hardware processor generates the image data in a data format allowing display of the image data by software for creating or editing print content while the image data is displayed with the print content.

15. The non-transitory recording medium according to claim 12, wherein the hardware processor generates the image data in a data format allowing display of the image data by software for creating or editing print content while the image data is displayed with the print content.

* * * * *